United States Patent [19]

Dillmann

[11] Patent Number: 5,124,115

[45] Date of Patent: Jun. 23, 1992

[54] BWR SERIES PUMP RECIRCULATION SYSTEM

[75] Inventor: Charles W. Dillmann, Morgan Hill, Calif.

[73] Assignee: General Electric Company, San Jose, Calif.

[21] Appl. No.: 667,799

[22] Filed: Mar. 11, 1991

Related U.S. Application Data

[63] Continuation-in-part of Ser. No. 553,073, Jul. 10, 1990, Pat. No. 5,116,567.

[51] Int. Cl.[5] .............................................. G21C 15/24
[52] U.S. Cl. ..................................... 376/372; 376/379; 376/406; 376/407
[58] Field of Search ............... 376/372, 373, 379, 406, 376/407; 976/DIG. 199, DIG. 207

[56] References Cited

U.S. PATENT DOCUMENTS

| | | | |
|---|---|---|---|
| 3,621,926 | 11/1971 | Townsend | 376/372 |
| 3,838,002 | 9/1974 | Gluntz et al. | 376/372 |
| 4,663,116 | 5/1987 | Masuhara et al. | 376/377 |
| 4,696,792 | 9/1987 | Hobson | 376/377 |
| 4,847,043 | 7/1989 | Gluntz | 376/372 |
| 4,879,087 | 11/1989 | Akiyama et al. | 376/372 |

OTHER PUBLICATIONS

Wilkins et al, *Advanced BWR: Design Improvements Build on Proven Technology*, Nuclear Engineering International, reprint Jun. 1986, pp. 1–7 and drawing entitled "The World's reactors No 89".

T. Baumeister, *Standard Handbook For Mechanical Engineers*, 1967, Title and copyright pages, and pp. 14–16 through 14–19.

Foster et al, "Basic Nuclear Engineering", 1977, pages: cover, copyright, 436–439 and 443–446.

*Primary Examiner*—Brooks H. Hunt
*Assistant Examiner*—Frederick H. Voss
*Attorney, Agent, or Firm*—Robert R. Schroeder

[57] ABSTRACT

A recirculation system is disclosed for driving reactor coolant water contained in an annular downcomer defined between a reactor vessel and a reactor core spaced radially inwardly therefrom. The system includes a plurality of circumferentially spaced pumps disposed in the downcomer, each pump including an inlet for receiving coolant water from the downcomer as pump inlet flow, and an outlet for discharging the pressurized water. The recirculation system firstly increases the pressure of the pump inlet flow at the pump inlet before being sucked into the pump for being further pressurized by the pump.

9 Claims, 4 Drawing Sheets

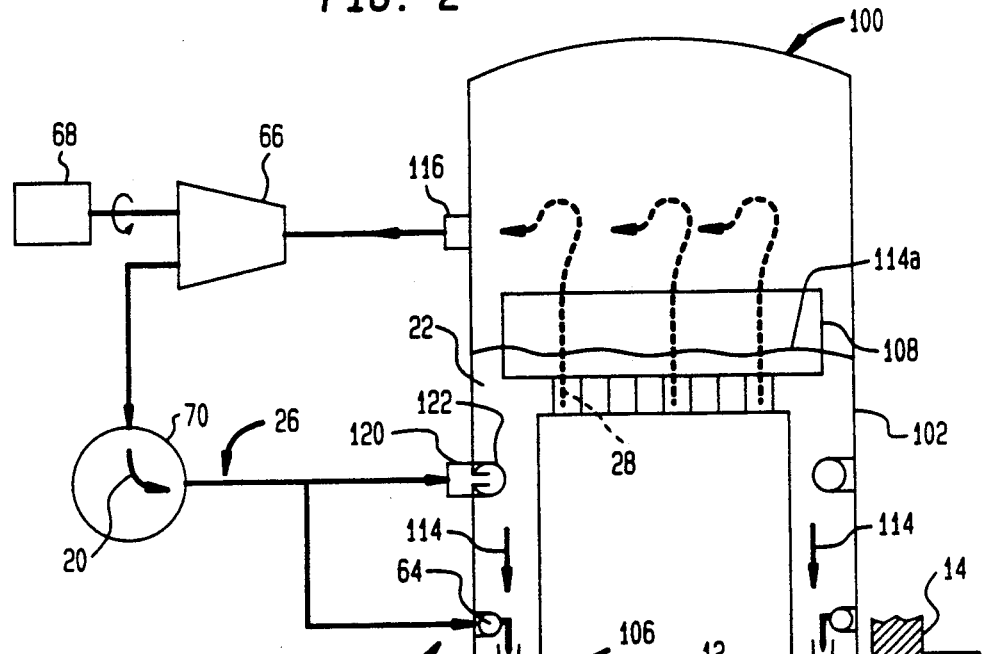
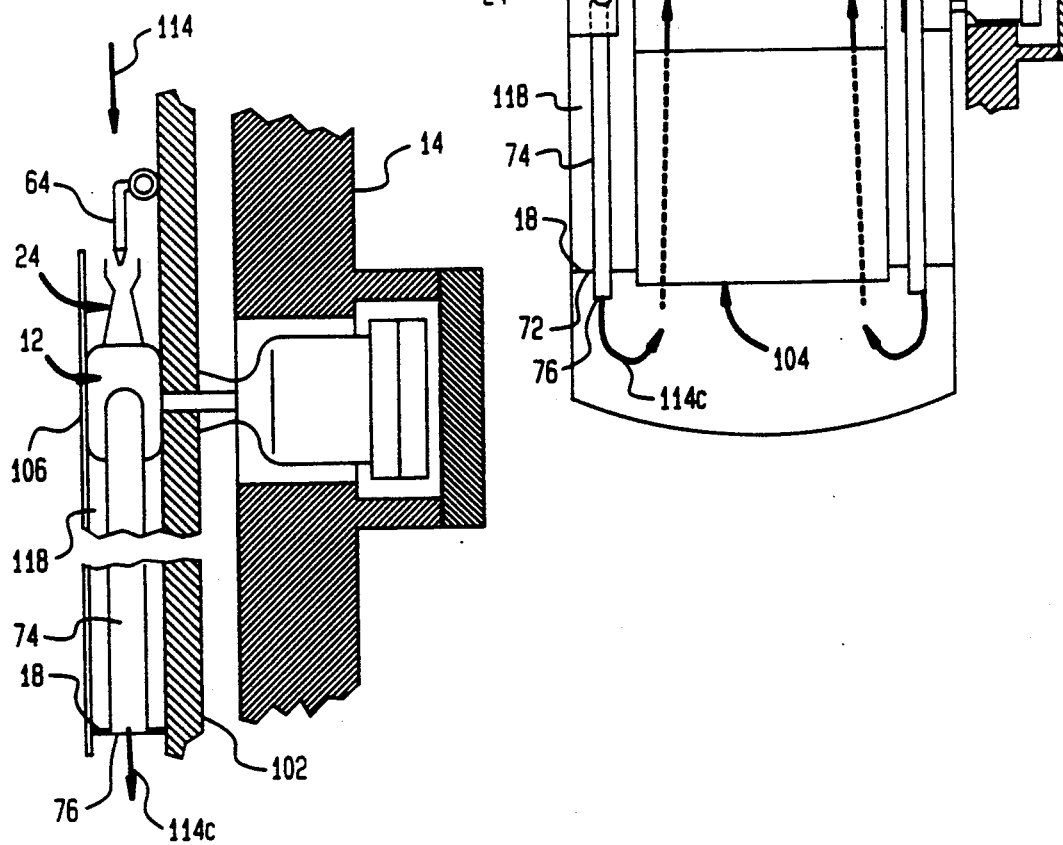
FIG. 2
FIG. 3

BWR SERIES PUMP RECIRCULATION SYSTEM

CROSS REFERENCE TO RELATED APPLICATION

This is a continuation-in-part of application Ser. No. 07/553,073, filed Jul. 10, 1990, now U.S. Pat. No. 5,116,567.

TECHNICAL FIELD

The present invention relates generally to a boiling water reactor (BWR), and, more specifically, to a reactor coolant water recirculation system therefor.

BACKGROUND ART

A conventional boiling water reactor includes a reactor pressure vessel within which is disposed a nuclear reactor core surrounded by an annular core shroud. The core shroud is spaced radially inwardly from the reactor vessel to define an annular flow channel, or downcomer, in which is recirculated reactor coolant water. The coolant water typically flows downwardly from near the top of the reactor vessel, through the downcomer, around the bottom of the core shroud and then upwardly through the reactor core wherein it is heated for generating steam which is then suitably channeled to a conventional steam turbine which powers an electrical generator for generating power for a utility grid.

The steam turbine extracts energy from the steam and causes the steam to condense into its liquid phase for forming feedwater. The feedwater is then returned to the reactor vessel under pressure from a conventional feedwater pump in a basically closed cycle. The feedwater returned to the reactor vessel is discharged from a conventional feedwater sparger from which it mixes with the reactor coolant water therein for repeating the cycle.

In order to increase the recirculation of the coolant water in the reactor vessel, conventional coolant pumps are provided, in one example, external of the reactor vessel, and are suitably connected thereto by external piping. The external piping loop system associated with the use of external coolant pumps has increased maintenance requirements in view of the relative complexity thereof and may lead to substantial radiation exposure to maintenance personnel working adjacent thereto due to radioactive corrosion deposition within the pipes.

In one advanced boiling water reactor design, a coolant pump is located inside the reactor vessel and is powered by a motor located outside the reactor vessel. Accordingly, a rotating shaft must extend through the reactor vessel and must include suitable seals for preventing leakage of the high pressure coolant water which flows within the reactor vessel. Such pump and motor arrangement is relatively complex and requires a relatively complex shaft seal for preventing leakage.

Furthermore, a typical boiling water reactor allows placement of the pump and motor arrangement in a limited area typically at the bottom of the reactor vessel adjacent to conventional control rod drives thus increasing congestion of these components and increasing the complexity of maintenance thereof. Since the pump is disposed at the vessel bottom, it must be suitably protected from any items which might fall thereon during maintenance operations, for example. Also, the pump must be effectively sealed to the reactor vessel for preventing leaking of the reactor coolant being circulated through the core disposed overhead.

The reactor core boils a portion of the recirculating coolant therein for forming steam which is dispelled upwardly in the pressure vessel from the water level, or surface, therein, which is also referred to as the water-steam interface. The pressure in the vessel at the water level is at the water saturation, or vapor, pressure. For example, the pressure inside an exemplary reactor vessel of a boiling water reactor at the water-steam interface is about 1,000 psi (6.89 MPa), with a water temperature of about 520° F. (271° C.). Since the pressure at the water-steam interface is at the vapor pressure of the boiling water, the recirculation pumps cannot be located at that height in the reactor since cavitation of the water at the inlet to conventional suction-type pumps would prevent effective operation of the pumps. Accordingly, conventional pumps utilized in the recirculation system of conventional boiling water reactors are located near the bottom of the reactor pressure vessel wherein the pressure of the coolant water is higher due to the pressure head of the water generated by the weight of the fluid above the pump so that the suction created by the pumps does not result in undesirable cavitation and the pumps can effectively pump the water therethrough.

Conventional centrifugal pumps are typically utilized in conventional recirculation systems, while conventional axial and axi-centrifugal pumps may also be used. Conventional water driven or steam driven jet pumps could also be utilized, but, however, they operate at efficiencies less than those associated with the conventional impeller driven type pumps disclosed above.

OBJECTS OF THE INVENTION

Accordingly, one object of the present invention is to provide a new and improved boiling water reactor recirculation system.

Another object of the present invention is to provide a recirculation system having a pump disposable within the reactor vessel above the reactor core.

Another object of the present invention is to provide a recirculation system having a pump capable of operation in the high temperature, high pressure environment within a reactor vessel, and without cavitation of the coolant water being channeled therethrough.

DISCLOSURE OF INVENTION

A recirculation system is disclosed for driving reactor coolant water contained in an annular downcomer defined between a reactor vessel and a reactor core spaced radially inwardly therefrom. The system includes a plurality of circumferentially spaced pumps disposed in the downcomer, each pump including an inlet for receiving coolant water from the downcomer as pump inlet flow, and an outlet for discharging the pressurized water. The recirculation system firstly increases the pressure of the pump inlet flow at the pump inlet before being sucked into the pump for being further pressurized by the pump.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

FIG. 2 is a schematic representation of the reactor illustrated in FIG. 1 including further components of the recirculation system.

FIG. 3 is a side partly sectional view of an enlarged portion of the recirculation system illustrated in FIG. 2 showing an exemplary eductor and recirculation pump.

MODE(S) FOR CARRYING OUT THE INVENTION

Figure 1:
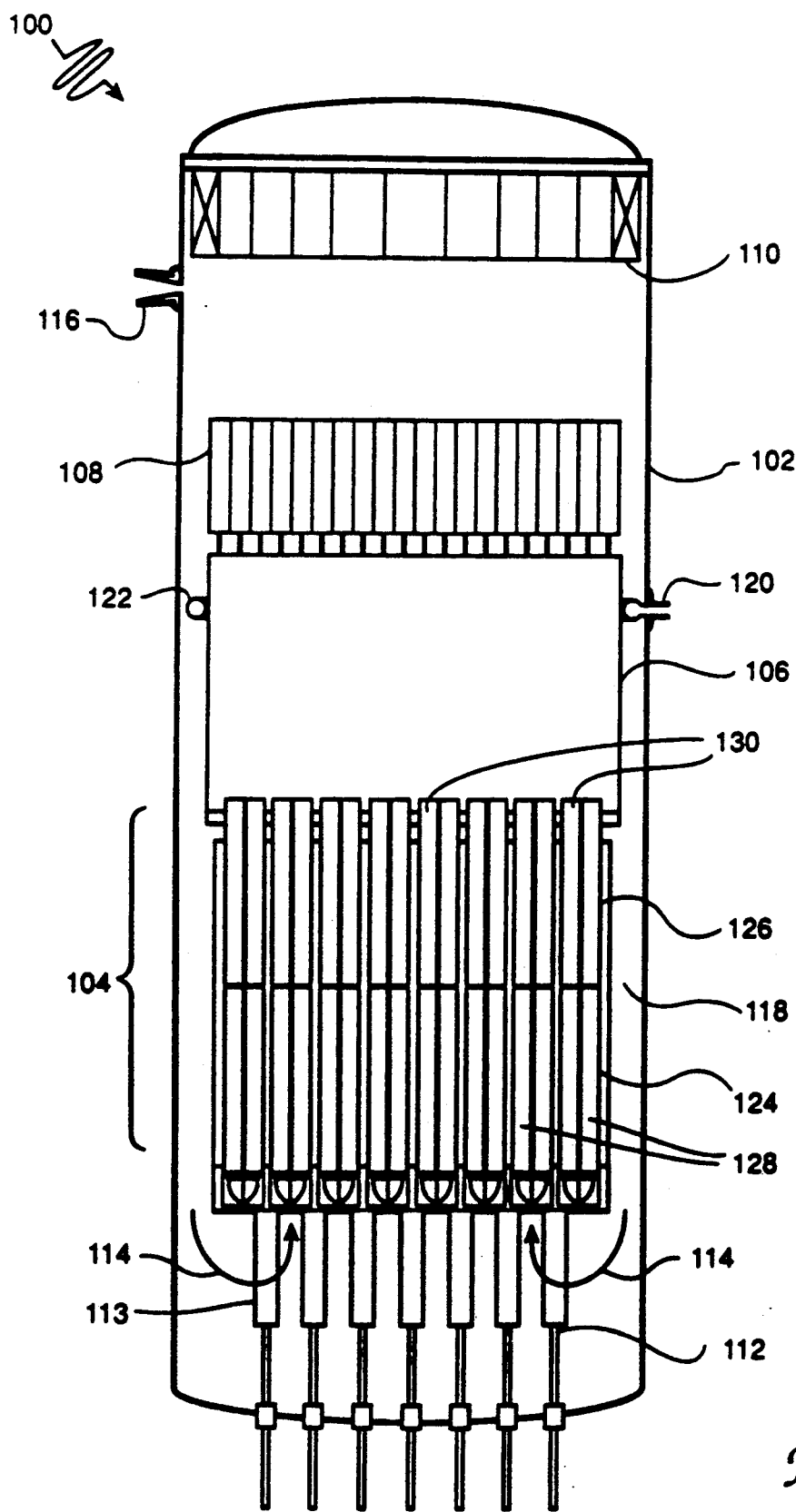
FIG. 1 is a schematic elevation sectional view of an exemplary reactor having a recirculation system in accordance with one embodiment of the present invention.

Illustrated in FIG. 1 is an exemplary natural circulation boiling water reactor 100 comprising a pressure vessel 102, a core 104, a chimney 106, a steam separator 108, and a steam dryer 110. Control rod drive housings 112 extend through the bottom of the vessel 102 and support control rod guide tubes 113. The control rod guide tubes 113 extend to the bottom of the core 104 so that conventional control blades therein can be inserted into and retracted from the core 104 to control its power output.

Water flows, as indicated by arrows 114, into the core 104 from below. This subcooled water is boiled within the core 104 to yield a water/steam mixture which rises through the chimney 106. The steam separator 108 helps separate steam from water, and the released steam exits through a steam exit 116 near the top of the vessel 102. Before exiting, any remaining water entrained in the steam is removed by the dryer 110. The separated water is returned down a peripheral downcomer 118 in part by the force of the driving steam head provided by the chimney 106, or by gravity due to the difference in water density therebetween. The feedwater enters vessel 102 through a feedwater inlet nozzle 120 and feedwater sparger 122 to replenish and help cool the recirculating water in the downcomer 118.

The core 104 comprises a lower fuel matrix 124 and an upper fuel matrix 126. The upper fuel matrix 126 is filled with upwardly oriented fuel bundles 130, and the lower fuel matrix 124 is filled with downwardly oriented fuel bundles 128.

The water 114 may be additionally recirculated through the downcomer 118 by conventional pumps as described above in the background section. For example, conventional axial or centrifugal motor-driven pumps could be used, or, alternatively, a steam-driven jet pump could be used, requiring an auxiliary steam source, but having no moving parts. However, such pumps have one or more of the disadvantages described above, and must be located at the bottom of the vessel 102 where the water pressure is greater to avoid cavitation of the water as it is sucked into the pumps.

Another embodiment, in accordance with the present invention as described below, uses two pumps in series flow which allows the pumps to be located vertically above the reactor core where the water is close to its vapor pressure, with the first pump raising the inlet pressure of the water channeled to the second pump to avoid, or reduce, the likelihood of cavitation.

More specifically, illustrated schematically in FIGS. 2 and 3 is a recirculation system 10 in accordance with one embodiment of the present invention for driving the reactor coolant water 114 in the downcomer 118 inside the pressure vessel 102. The recirculation system 10 for the preferred embodiment uses internal pumps. The preferred forced circulation system 10 has conventional pumps 12 mounted through a conventional bioshield 14 (only a portion of which is illustrated) which surrounds the vessel 102, the pumps 12 are conventionally mounted to the wall of the vessel 102 and include an impeller case inside the vessel 102. The pumps 12 are at an elevation above the core 104 and below the feedwater headers. Each pump discharge is connected to an outlet duct 74 to a lower support 18, in accordance with one embodiment.

In the suction improvement feature, feedwater 20, rather than being sparged through the sparger 122 into an upper plenum 22 of the vessel 102 above the chimney 106 and below the water level 114a in the vessel 102, is directed to a low head eductor 24 that raises the suction pressure enough to avoid cavitation. This feature also produces thorough mixing of the feedwater 20 and the recirculation flow 114, thereby providing uniform core inlet enthalpy. The net positive suction head (NPSH) is expected to be adequate during periods of low feedwater flow because the pumps 12 will be on low speed during that time. The side-mounted location of the pumps 22 allows them to be of larger diameter than the under-vessel pumps of forced-circulation boiling-water reactors (FCBWRs) and therefore they can be designed to have adequate inertia so that in the event of a loss of power to the driving motor 40 they will coast down slowly, thereby avoiding a sharp flow transient which would affect fuel cooling.

The downcomer 118 is an annular flow channel defined between the nuclear reactor vessel 102 and, in one embodiment, the reactor core 104 and the chimney 106 both spaced radially inwardly therefrom. Means 26 for supplying the feedwater 20 to the vessel 102 are shown schematically. A plurality of the internal pumps 12 in accordance with one embodiment of the present invention are disposed and spaced circumferentially from each other inside the downcomer 118 for driving the coolant water 114 downwardly through the downcomer 118 for increasing the recirculation thereof.

Referring again to FIG. 2, the water level 114a is alternatively referred to as the water-steam interface since steam 28 is being produced by boiling of the water 114 by the core 104, with the steam 28 being dispelled upwardly from the water level 114a through the upper plenum 22 and the steam separator 108 for subsequent discharge from the vessel 102 through the steam exit 116. At the water level 114a, the water 114 is at its saturation or vapor pressure since boiling is occurring. In the exemplary embodiment of the reactor 100 illustrated in FIG. 2, the coolant water 114 at the water-steam interface 114a is about 520° F. (271° C.) and at about 1,000 psi (metric 6.89 MPa). Due to the height of the water 114 in the vessel 102, its pressure increases downwardly from the water level 114a to the bottom of the vessel 102 due to its own weight, which is conventionally known as the pressure head of the water 114. In a conventional reactor, pump inlets are disposed at or near the bottom of the reactor vessel to take advantage of the water pressure head for preventing cavitation of the water being sucked into the pumps.

In accordance with one object of the present invention, the pumps 12 may be located vertically above the reactor core 104 and not at the bottom of the vessel 102. This provides additional access space for the conventional control rod drives disposed at the bottom of the vessel 102; places the pumps 12 higher in the vessel 102 for reducing the likelihood of any debris falling thereon during maintenance operations; and eliminates a source for leaking of the coolant 114 from the vessel 102 below the core 104. In the vessel side-mounted arrangement of the pumps 12 illustrated in FIGS. 2 and 3, the pumps 12 are more readily accessible for both installation and maintenance purposes.

However, the pumps 12 which may be any conventional type of water pump including centrifugal, semi-centrifugal, or axial flow pumps, would be subject to cavitation of the inlet flow therein since they are preferably positioned above the reactor core 104 and below the water level 114a where the pressure of the water 114 is relatively close to its vapor pressure, which increases the likelihood of cavitation of the flow in the pump which would in turn cause an interruption in the flow volume through the pumps. In accordance with one embodiment of the present invention, the eductor 24 is provided in series flow with each of the pumps 12 and acts as a separate pump in means for increasing the static pressure of the pump inlet flow at the inlet to each pump 12, which, therefore, raises the water pressure above the vapor pressure of the inlet flow 114b for decreasing the likelihood of cavitation.

Figure 5:
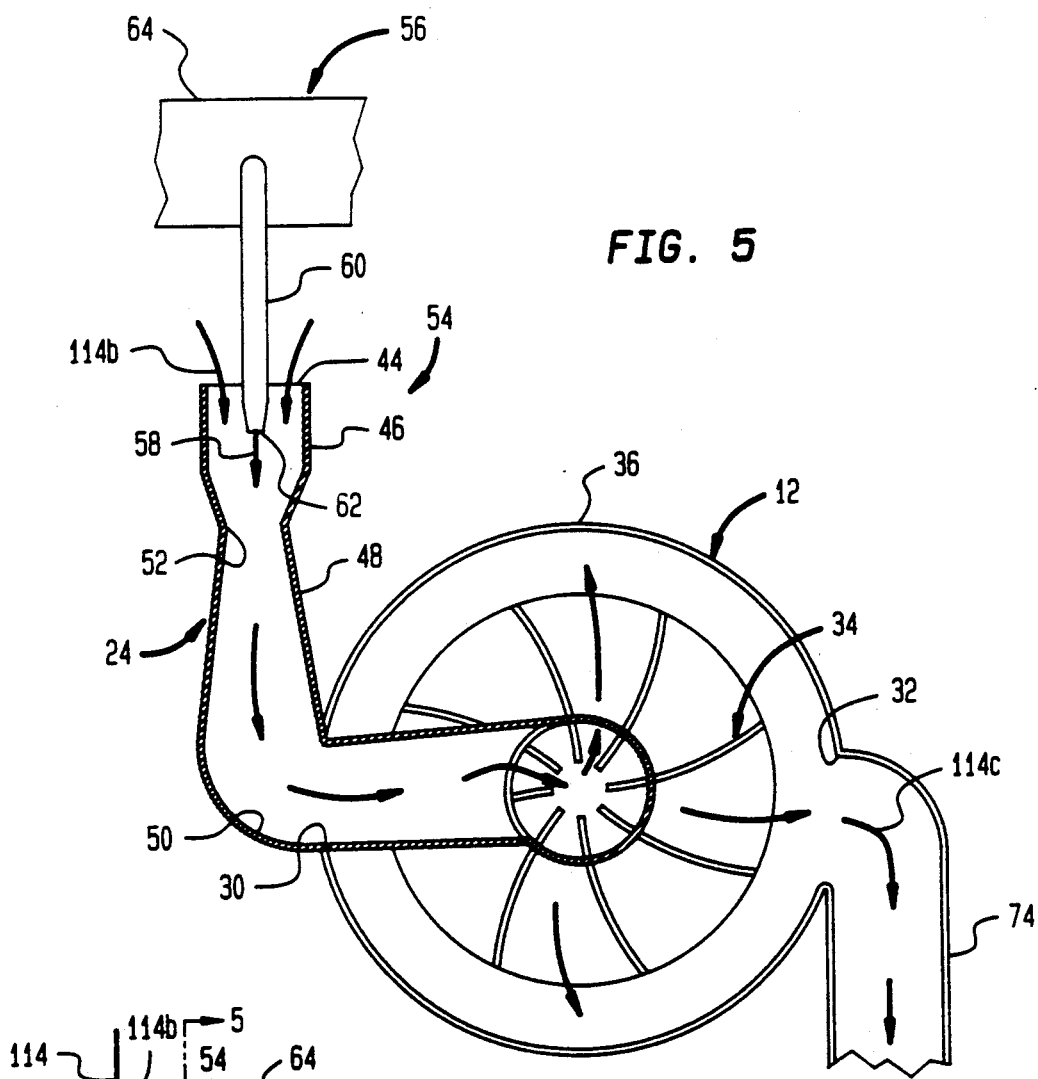
FIG. 5 is a transverse sectional view of a portion of the educator and pump illustrated in FIG. 4 taken along line 5—5.
Figure 4:
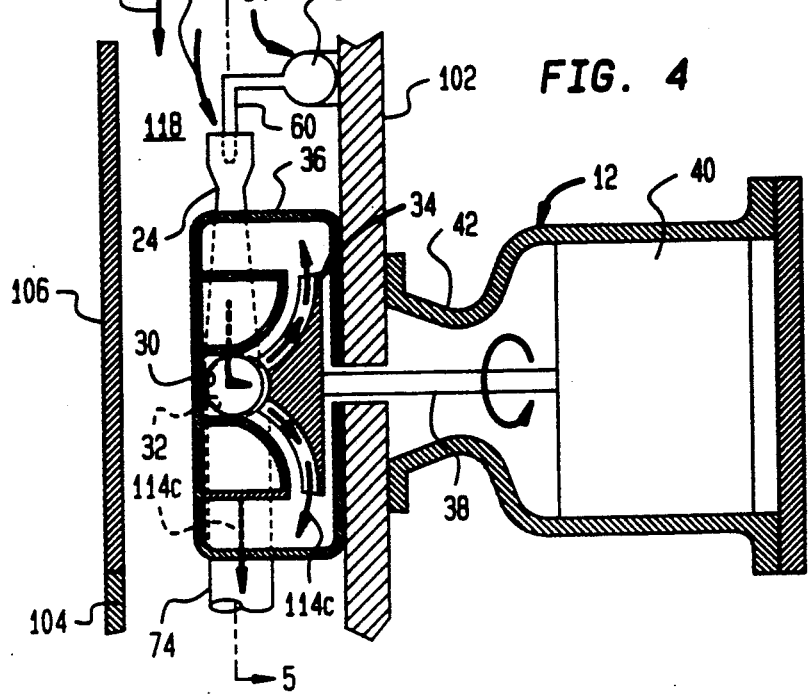
FIG. 4 is a schematic longitudinal sectional view of the exemplary educator and pump illustrated in FIG. 3 in accordance with an exemplary embodiment of the present invention.

Illustrated in FIGS. 4 and 5, in more particularity, is one embodiment of the eductor 24 in series flow with the pump 12. Each of the pumps 12 includes an inlet 30 for receiving from the downcomer 118 a portion of the coolant water 114 as pump inlet flow 114b, and an outlet 32 for discharging the pump inlet flow 114b pressurized in the pump 12 as pump outlet flow 114c.

In the exemplary embodiment of the invention illustrated in FIGS. 4 and 5, the pump 12 is a conventional centrifugal pump, shown schematically, having a radial flow impeller 34 disposed inside an annular impeller case 36 which includes the inlet 30 for receiving the pump inlet flow 114b, and the outlet 32 for discharging the pressurized pump outlet flow 114c. An impeller shaft 38 extends through an aperture in the vessel wall 102 and is fixedly joined to the impeller 34 and to a conventional electrical motor 40, which is conventionally selectively operable for rotating the impeller 34 at varying speeds for controlling the volume flow rate and pressure increase provided by the pump 12. The shaft 38 and the motor 40 are conventionally contained inside a pressure housing 42 conventionally fixedly joined to the outer surface of the vessel 102 for providing a portion of the pressure vessel 102 for containing any of the pressurized water coolant 114 which may leak therein. The motor 40 is preferably a conventional wet motor which may be immersed in the pressurized water coolant 114.

The eductor 24, or pressure increasing means, is a conventional venturi, or jet, pump having in serial flow communication an inlet 44, a mixing portion 46, a diverging diffuser 48 and an outlet 50. The mixing portion in this exemplary embodiment is a cylindrical tube having a converging downstream end ending in a throat 52 of minimum flow area.

The eductor 24 is one component of the means 54 for increasing the static pressure of the pump inlet flow 114b. The pressure increasing means 54 further includes means 56 for supplying a driving fluid 58 having kinetic energy to the eductor inlet 44 for mixing with the pump inlet flow 114b first received by the eductor inlet 44. The eductor diffuser 48 is effective for reducing velocity of the driving fluid 58 mixed with the flow 114b for increasing the static pressure of the pump inlet flow 114b channeled through the diffuser 48 with the driving fluid 58. The eductor mixing portion 46 allows the driving fluid 58 and the pump inlet flow 114b to mix with each other on contact, and are further additionally mixed in the diffuser 48, and discharged from the eductor outlet 50 to the pump inlet 30. Accordingly, the relatively high velocity of the driving fluid 58 provides kinetic energy to the pump inlet flow 114b, which is transformed into an increase in static pressure of the pump inlet flow 114b in the eductor diffuser 48, with a corresponding reduction in velocity of the driving fluid 58. In this way, the eductor 24 is used for increasing the pressure of the pump inlet flow 114b at the pump inlet 30 for reducing the likelihood of cavitation which might otherwise occur by placing the pump 12 above the reactor core 104 in the vessel 102 in a region at or near the vapor pressure of the water 114.

The driving fluid supplying means 56 in one embodiment of the invention, include a conventional nozzle 60 having an outlet 62 positioned at the eductor inlet 44, and preferably inside the eductor inlet 44, for discharging the driving fluid 58 as a relatively high velocity jet having kinetic energy. The driving fluid supplying means 56 further include a feedwater header 64 disposed in flotation with the nozzle 60, and the driving fluid 58 preferably is the feedwater 20 channeled from the header 64 so that it is compatible with the water 114.

The steam 28 generated by the reactor 100 is discharged therefrom through the steam exit 116 as illustrated in FIG. 2, and is conventionally channeled to a conventional steam turbine 66 which, for example, drives a conventional electrical generator 68 for providing electrical power to a utility grid. Energy is extracted from the steam 28 in the steam turbine 66, with the steam 28 being conventionally condensed into its liquid phase again for forming the feedwater 20.

The feedwater supplying means 26 includes a conventional feedwater pump 70 disposed conventionally in flow communication between the steam turbine 66 and the reactor vessel 102. The feedwater 20 is conventionally channeled from the pump 70 to the feedwater header 64 at a suitably high pressure greater than that pressure inside the vessel 102 at the nozzle outlet 62, for example about 25 psi (metric 0.17 MPa) greater than the pressure of the coolant water 114 at the eductor inlet 44, for providing the preferred kinetic energy in the driving fluid 58, or pressurized feedwater 20. The resulting rise in pressure of the inlet flow 114b channeled through the eductor 24 to the pump inlet 30 may be about 5 psi (metric 0.034 MPa).

Furthermore, the feedwater 20 provided to the header 64 is at a temperature below that of the coolant water 114 at the top of the downcomer 118. Accordingly, the use of the feedwater 20 for the suction improvement drive fluid 58 has the advantage of providing intimate mixing of the feedwater 20 and the recirculation coolant water 114, and for the quenching thereof. The feedwater 20 channeled through the header 64 and the nozzle 60 may alone be used for the conventional quenching of the coolant water 114 at the top of the downcomer 118, or may be used in addition to the conventional sparger 122 for this purpose.

The feedwater 20 discharged from the nozzle 60 as the driving fluid 58 additionally provides subcooling of the pump inlet flow 114b which supplements the pressure increase of the eductor 24 by increasing the density of the inlet flow 114b to further decrease the likelihood of cavitation. In alternate embodiments, the driving fluid 58 may be provided by other than the feedwater 20. For example, steam may be used for the driving fluid 58. However, it is not desirable since it would increase the temperature of the coolant water 114 in the downcomer 118.

In a conventional boiling water reactor, a relatively large and expensive core shroud (not shown) surrounds the core 104 and extends downwardly therefrom. The conventional core shroud defines in part the downcomer 118 for channeling the reactor coolant water 114 downwardly through the downcomer 118 and around the bottom of the core shroud and then upwardly into the core 104. The conventional core shroud confines the coolant water 114 to flow downwardly through the downcomer 118 and then upwardly through the core 104 for providing a portion of the recirculation path.

In the embodiment of the present invention illustrated FIG. 2, a conventional core shroud is not required. However, in order to prevent the pump outlet flow 114c from recirculating within the downcomer 118 and back into the pump inlet 30, the pumps 12 are preferably configured as follows.

Referring again to FIG. 2, the recirculation system 10 further includes an annular baffle plate, for example in the form of the lower support 18, fixedly disposed between the vessel 102 and the core 104 and including a plurality of circumferentially spaced holes 72. Each of the pumps 12 preferably includes an outlet duct or pipe 74 extending in flow communication from the pump outlet 32 downwardly in the downcomer 118 and through a respective one of the baffle holes 72. Each of the ducts 74 has an outlet 76 for discharging the pump outlet flow 114c channeled therethrough. The baffle plate 18 is disposed in the downcomer 118 between the pump inlet 30 and the duct outlet 76 for preventing flow of the pump outlet flow 114c back into the pump inlet 30 within the downcomer 118, i.e., preventing local recirculation, to ensure that the outlet flow 114c is recirculated upwardly through the core 104.

Accordingly, relatively inexpensive outlet ducts 74 and the baffle 18 may be used instead of a conventional core shroud for channeling the pump outlet flow 114c downwardly through the downcomer 118 while preventing recirculation of the pump outlet flow 114c up the downcomer 118 prior to being channeled upwardly through the core 104.

Also as illustrated in FIG. 2, each of the pumps 12 is preferably disposed vertically above the core 104 in the downcomer 118, and the baffle plate 18 is disposed at the bottom end of the core 114 horizontally in the downcomer 118. In this way, the pump outlet flow 114c is channeled from the pump 12 above the core 114 downwardly through the downcomer 118 to be discharged from the duct outlet 76 below the core 104.

Figure 6:
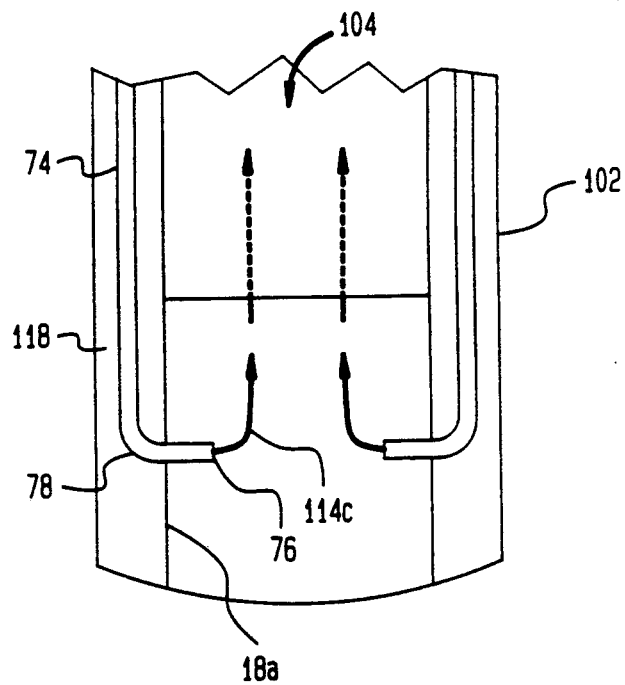
FIG. 6 is a schematic elevation sectional view of the bottom portion of the reactor illustrated in FIG. 2 showing a portion of the recirculation system in accordance with another embodiment of the present invention.

Illustrated in FIG. 6 is an alternate embodiment of the present invention, wherein the baffle plate 18 is in the form of an annular or cylindrical core shroud 18a extending downwardly from the bottom end of the core 104 to the bottom of the vessel 102. The ducts 74 extend further downwardly in the downcomer 118 below the bottom of the core 104 and each has a distal end 78 extending horizontally through the core shroud 18a for positioning the duct outlet 76 below the core 104. In this embodiment of the present invention, the core shroud 18a may be substantially smaller than the core shroud conventionally used in a reactor since it need only extend from the core 104 downwardly to the bottom of the vessel 102. In the event that maintenance requires replacement of the core shroud 18a, the replacement of the relatively small core shroud 18a is preferred over the replacement of the conventionally larger core shroud surrounding the core 104 which would otherwise be conventionally used.

Figure 7:
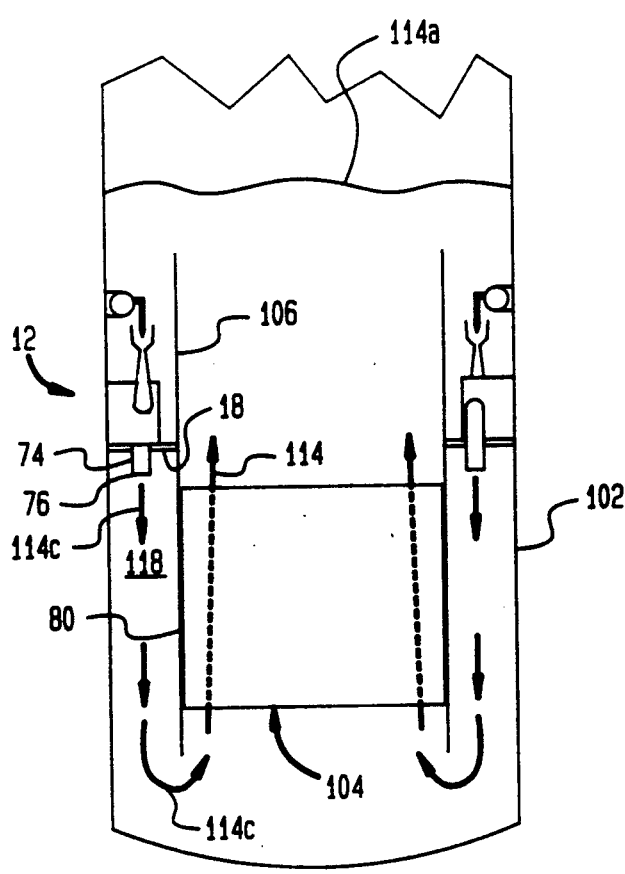
FIG. 7 is a schematic elevation sectional view of the bottom portion of the reactor illustrated in FIG. 2 showing a recirculation system in accordance with another embodiment of the invention.

Illustrated in FIG. 7 is an alternate embodiment of the present invention having a conventional annular core shroud 80 surrounding the core 104 and extending from its top to below its bottom. The chimney 106 extends upwardly from the core shroud 80 and the downcomer 118 is defined between the vessel 102 and both the core shroud 80 and the chimney 106. In this embodiment, the baffle plate 18 is disposed between the top end of the core 104 and the water level 114a horizontally below the pumps 12 in the downcomer 118. The ducts 74 need only extend downwardly just through the baffle plate 18 for positioning the outlets 76 for discharging the pump outlet flow 114c back into the pump inlet 30. The downcomer 118 then provides a channel for the downward flow of the pump outlet flow 114c to the bottom of the vessel 102 where it turns radially inwardly around the distal end of the core shroud 80 and then flows upwardly through the core 104.

Figure 8:
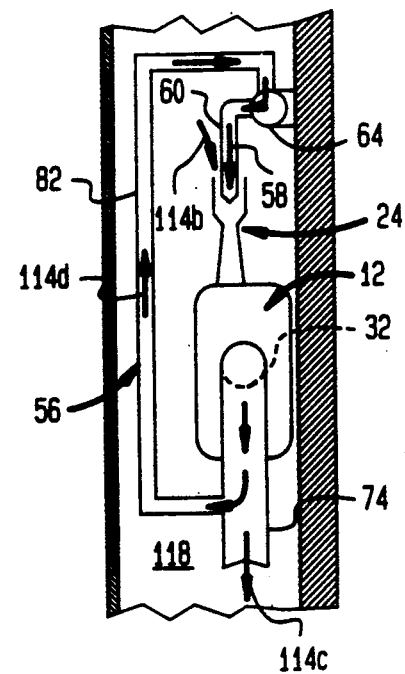
FIG. 8 is a schematic elevation side view of a portion of the reactor illustrated in FIG. 2 showing the eductor and pump of the recirculation system in accordance with another embodiment of the present invention.

Illustrated in FIG. 8 is an alternate embodiment of the present invention wherein the driving fluid supplying means 56 further includes a return conduit 82 disposed in flow communication with the pump outlet 32 and the nozzle 60 for channeling a portion 114d of the pressurized pump outlet flow 114c to the nozzle 60 as the driving fluid 58. In this embodiment, the return conduit 82 may be conventionally joined in flow communication with the duct 74 downstream of the pump outlet 32 and with the header 64. The header 64 is not joined in flow communication with the feedwater pump 70 as in the embodiment described above with respect to FIG. 2, for example, and the driving fluid 58 is provided solely by the return portion 114d of the pump outlet flow 114c.

In all of the embodiments of the invention disclosed above, it is noted that periods of low flow of the feedwater 20 correspond to periods of low power output of the reactor 100, with the speed of the pumps 12 being correspondingly low all as controlled by conventional control means (now shown), and with a correspondingly reduced need for cavitation mitigation. Correspondingly, the flow from the nozzles 60 is reduced, which reduces the increase in pressure of the pump inlet flow 114b by the eductor 24 since the pumps 12 produce less suction at the inlets 30.

While there has been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A recirculation system for driving reactor coolant water contained in an annular downcomer defined between a boiling water reactor vessel and a reactor core spaced radially inwardly therefrom comprising:
   a plurality of circumferentially spaced second pumps disposed in said downcomer, each including an inlet for receiving from said downcomer a portion of said coolant water as pump inlet flow, and an outlet for discharging said pump inlet flow pressurized in said second pump as pump outlet flow; and
   means for increasing pressure of said pump inlet flow at said pump inlet including a first pump disposed in series flow with said second pump for first receiving said pump inlet flow from said downcomer and discharging to said second pump said pump inlet flow pressurized in said first pump.

2. A recirculation system according to claim 1 wherein said pressure increasing means include:
   said first pump comprising an eductor having in serial flow communication an inlet for first receiving said pump inlet flow from said downcomer, a mixing portion, a diffuser, and an outlet for discharging to said second pump inlet said pump inlet flow pressurized in said eductor; and
   means for supplying a driving fluid to said eductor inlet for mixing with said pump inlet flow first received by said eductor inlet, said diffuser being effective for reducing velocity of said driving fluid mixed with said pump inlet flow for increasing static pressure of said pump inlet flow channeled through said diffuser with said driving fluid and discharged from said eductor outlet to said pump inlet.

3. A recirculation system according to claim 2 wherein said driving fluid supplying means include a nozzle having an outlet positioned at said eductor inlet for discharging said driving fluid as a jet having kinetic energy.

4. A recirculation system according to claim 3 wherein said driving fluid supplying means further include a return conduit disposed in flow communication with said pump outlet and said nozzle for channeling a portion of said pressurized pump outlet flow to said nozzle as said driving fluid.

5. A recirculation system according to claim 3 wherein said driving fluid supplying means further include a feedwater header disposed in flow communication with said nozzle, and said driving fluid is feedwater channeled from said header and through said nozzle to said eductor inlet.

6. A recirculation system according to claim 5 further including an annular baffle plate fixedly disposed between said vessel and said core and including a plurality of circumferentially spaced holes; and wherein
   each of said second pumps includes an outlet duct extending from said pump outlet downwardly in said downcomer and through a respective one of said baffle holes, said outlet duct having a duct outlet for discharging said pump outlet flow channeled therethrough, and said baffle plate being disposed between said pump inlet and said duct outlet for preventing recirculation in said downcomer of said pump outlet flow into said pump inlet.

7. A recirculation system according to claim 6 wherein each of said second pumps is disposed above said core in said downcomer, and said baffle plate is disposed at a bottom end of said core horizontally in said downcomer.

8. A recirculation system according to claim 6 wherein:
   each of said second pumps is disposed above said core in said downcomer;
   said baffle plate comprises an annular core shroud extending downwardly from a bottom end of said core to a bottom of said vessel; and
   said ducts extend downwardly in said downcomer and each has a distal end extending horizontally through said core shroud for positioning said duct outlet below said core.

9. A recirculation system according to claim 6 wherein each of said second pumps is disposed above said core in said downcomer, said baffle plate is disposed at a top end of said core horizontally in said downcomer, and said downcomer is defined between said vessel and an annular core shroud surrounding said core.

* * * * *